United States Patent Office 2,819,270
Patented Jan. 7, 1958

2,819,270

DYES OF THE DIBENZANTHRONE SERIES

Wilhelm Schmidt-Nickels, Little York, N. J., assignor to General Aniline & Film Corporation, New York, N. Y., a corporation of Delaware No Drawing. Application February 7, 1956
Serial No. 563,857

4 Claims. (Cl. 260—272)

The invention here presented is a new type of black dyestuff of unusually good light stability, excellent blackness which can be prepared from a single intermediate to yield a high-grade vat dyestuff.

Black vat dyestuffs are known in many forms and kinds, but they tend to be somewhat expensive if made for highest quality, and usually involve several essential intermediates, usually intermediates not available on the open market.

The present invention presents a high grade vat dyestuff of excellent light stability, excellent fastness and easy preparation from a single, readily available intermediate. The dyestuffs of the new type here presented use as their intermediate the substance known as aminodibenzanthrone or aminoviolanthrone which is a regular article of commerce and readily available. It is obtained by nitration of dibenzanthrone (violanthrone), followed by reduction. The preparation is well shown in Centralblatt, 1929; II; 496. The method of preparation is also well shown in French Patent No. 651,152 issued February 15, 1929.

The process of the invention starts with aminoviolanthrone having the formula:

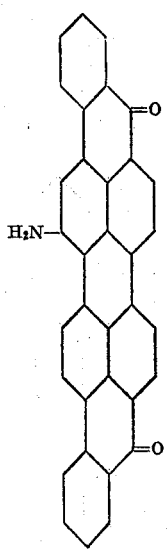

This material is treated, in a high-boiling solvent such as nitrobenzene, with ethylchlorocarbonate to yield the compound of the structural formula:

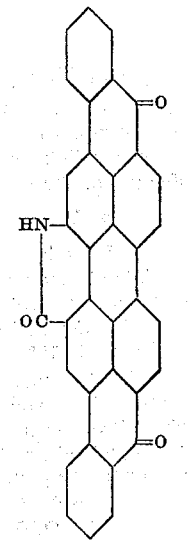

This in turn is brominated to yield:

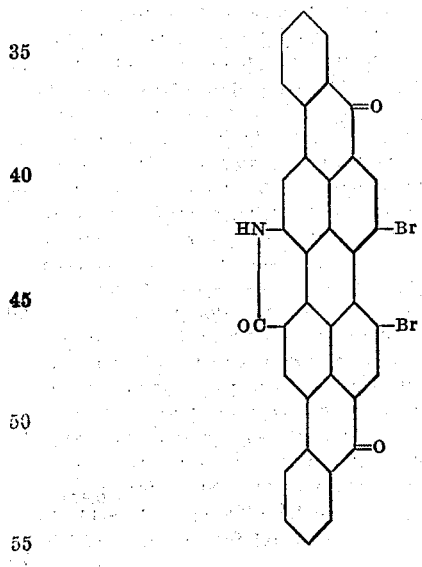

The bromine compound is then autoclaved with ammonia in presence of a copper catalyst to yield the desired dyestuff of the following structure:

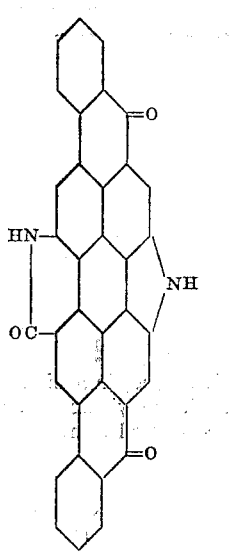

This is the dyestuff of the invention giving an excellent deep black from a hydrosulfite vat. It shows an excellent light-fastness and good fastness to washing and chlorine.

The following examples will show the detailed procedure for the manufacture of the material:

*Example 1*

A charge of: 640 parts by volume nitrobenzene; 62.8 parts by weight aminoviolanthrone with a nitrogen analysis of 2.81% and 63.6 parts by volume of chloroethyl carbonate was stirred at 90–95° C. for 2 hours, at 130–135° C. for 2 hours, at 150–155° C. for 2 hours and finally at 170–175° C. for 2 hours. After allowing to cool to room temperature the reaction product was filtered off, washed with nitrobenzene, with benzene and then dried. The weight obtained was 61.4 parts by weight equivalent to a yield of 93% of the theory of the greyish-blue vat dyestuff of the formula $C_{35}H_{15}O_3N$. Found: N=3.00%. Theory for $C_{35}H_{15}O_3N$: N=2.82%. (The accuracy of all nitrogen analyses was about +0.2%.) 29.9 parts by weight of the product of the above preparation and 3.0 parts by weight iodine were introduced into 450 parts by volume nitrobenzene. The mixture was heated to 155–160° C. At this temperature a solution of 12.3 parts by volume bromine in 60 parts by volume nitrobenzene was dropped into the mixture under agitation during 90 minutes. Finally, the charge was stirred at 155–160° C. for 4 hours. The reaction mixture was allowed to cool to room temperature and filtered. The cake was washed with nitrobenzene, with benzene and then dried. The weight obtained was 32.8 parts by weight equivalent to a yield of 83% of the theory of the blue-grey vat dyestuff of the formula $C_{35}H_{13}O_3NBr_2$. Found: Br=24.58%, N=2.29%. Theory for $C_{35}H_{13}O_3NBr_2$: Br=24.43%, N=2.14%. An autoclave was charged with 360 parts by volume 28% aqueous ammonia, 24 parts by weight of the dibrom compound of the above preparation and 3 parts by weight of crystallized copper sulfate. The mixture was stirred at 200 C. for 10 hours. The reaction product was filtered off, washed neutral and dried. The weight obtained was 16.5 parts by weight, equivalent to a yield of 88% of the theory, of the New Vat Black of the formula $C_{35}H_{14}O_3N_2$. Found: N=5.27%, Br=0%. Theory for $C_{35}H_{14}O_3N_2$: N=5.49%. The product dyed cotton from a hydrosulfite vat a deep black of excellent light-fastness and good fastness to washing and chlorine.

*Example 2.—Preparation of the leuco sulfuric acid ester salt of the Vat Black of Example 1*

12.1 parts by weight of the Vat Black prepared as described in Example 1 was introduced at 48° C. into a mixture of 120 parts by volume of pyridine and 12 parts by volume of chlorosulfonic acid. After addition of 8 parts by weight of iron by hydrogen and 0.2 part by weight of cuprous chloride the charge was stirred in an atmosphere of carbon dioxide gas for 4 hours at 53–55° C. The reaction product was poured into a solution of 40 parts by weight of sodium carbonate in 240 parts by volume of water. After removal of the pyridine by distillation under diminished pressure the aqueous leuco ester salt solution was filtered off the iron sludge and salted out by the addition of sodium chloride. The product printed cotton grey by the conventional methods.

By the process of the invention there is thus obtained a new dyestuff having the constitution as above indicated which gives a black of excellent light-fastness and good fastness to chlorine and washing. It is easily made from a relatively inexpensive intermediate and is in every way a desirable dyestuff.

While there are above disclosed but a limited number of embodiments of the process of the invention it is possible to provide still other embodiments without departing from the inventive concept herein disclosed; and it is therefore desired that only such limitations be imposed upon the appended claims as are stated therein or required by the prior art.

The invention claimed is:

1. A black dyestuff having the structural formula:

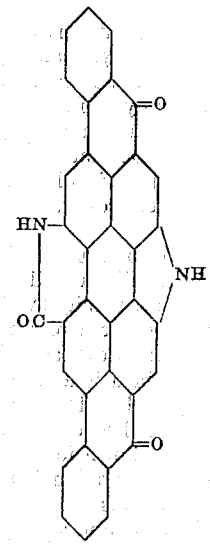

2. A black dyestuff having the structural formula

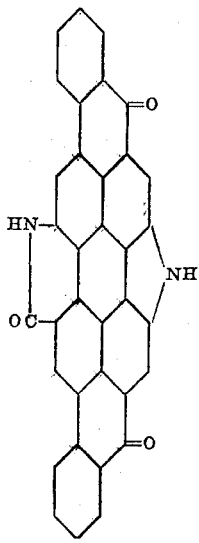

prepared by reacting an aminoviolanthrone having a nitrogen content within the range between 2.5% and 3.5% with chloroethyl carbonate, brominating the resulting product to produce a dibrom derivative and autoclaving the derivative with aqueous ammonia in the presence of a copper catalyst.

3. A black dyestuff having the structural formula

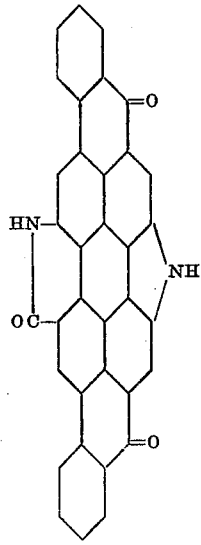

prepared by reacting an aminoviolanthrone having a nitrogen content within the range between 2.5% and 3.5% with chloroethyl sulfonic acid, brominating the resulting product to produce a dibrom derivative and autoclaving the derivative with aqueous ammonia in the presence of a copper catalyst the said dyestuff being in the form of the leuco-sulfuric acid ester salt.

4. A method for preparing a black dyestuff having a structural formula

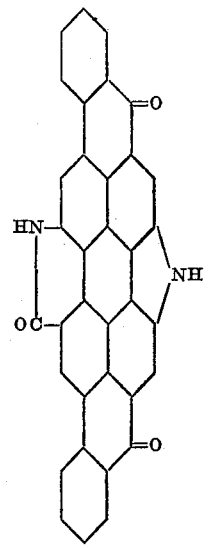

comprising the steps in combination of mixing together 640 parts by volume of nitrobenzene, 62.8 parts by weight of aminoviolanthrone and 63.6 parts of chloroethyl carbonate, stirring the mixture for two hours at 90–95° C.; at two hours more at 130–135° C. and for an additional two hours at 170–175° C.; thereafter cooling to room temperature filtering out the solid reaction product mixing together 29.9 parts by weight of the reaction product with 3 parts of iodine and 450 parts of nitrobenzene; heating the mixture to a temperature of about 155–160° C. and adding thereto a solution of 12.3 parts of bromine in 60 parts nitrobenzene, and thereafter stirring the mixture for four hours at 155–160° C. filtering out the reaction product and autoclaving 24 parts of the second reaction product with 360 parts of aqueous ammonia and three parts of crystallized copper sulfate.

References Cited in the file of this patent
FOREIGN PATENTS
709,400   Great Britain _____ May 26, 1954